Dec. 3, 1963 A. MONTENARE 3,112,784
DEMOUNTABLE TRACTION DEVICE FOR AUTOMOBILE WHEELS
Filed Sept. 19, 1960 3 Sheets-Sheet 1
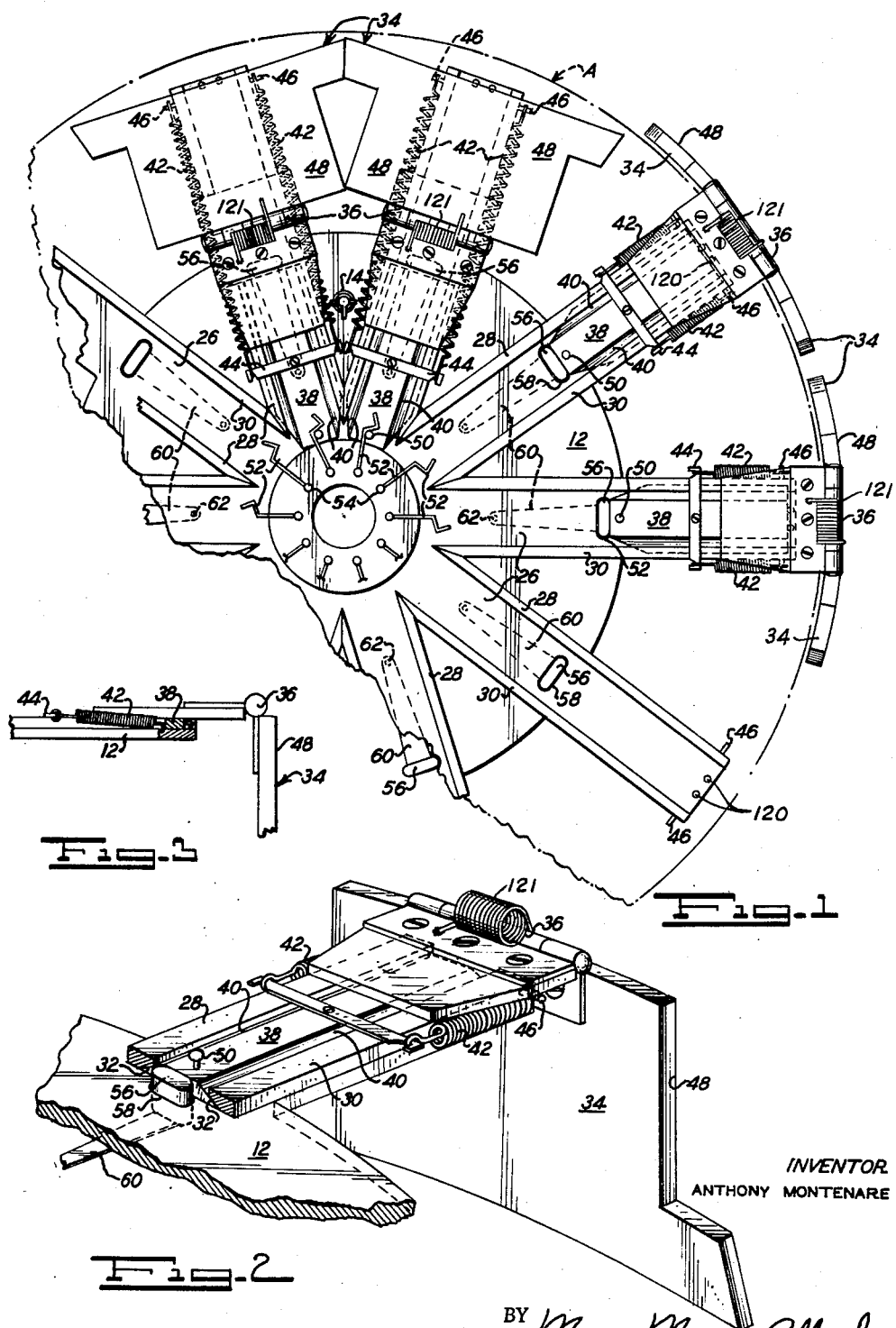
INVENTOR
ANTHONY MONTENARE
BY *Mason, Mason & Albright*
ATTORNEYS Dec. 3, 1963    A. MONTENARE    3,112,784
DEMOUNTABLE TRACTION DEVICE FOR AUTOMOBILE WHEELS
Filed Sept. 19, 1960    3 Sheets-Sheet 2

INVENTOR
ANTHONY MONTENARE

BY Mason, Mason & Albright
ATTORNEYS

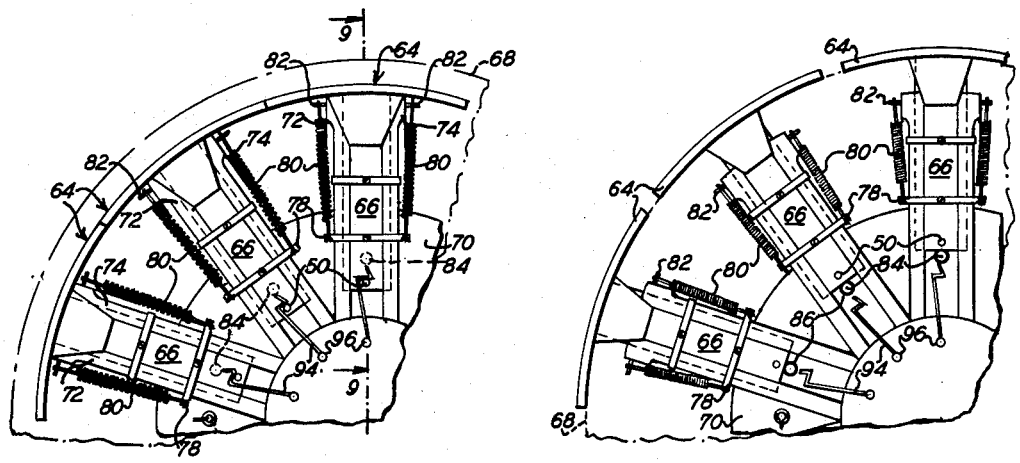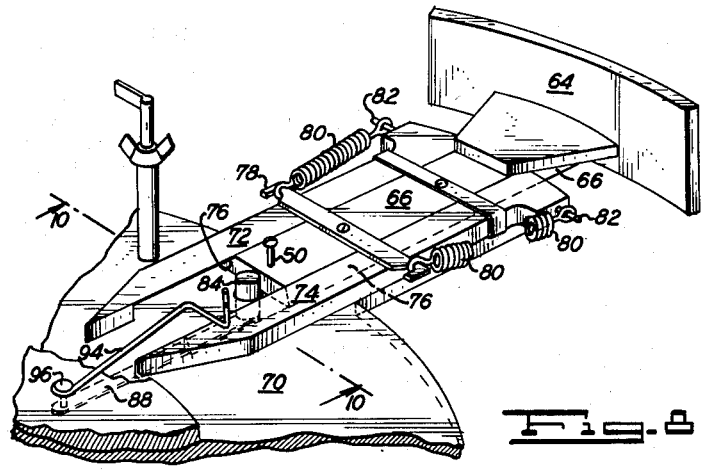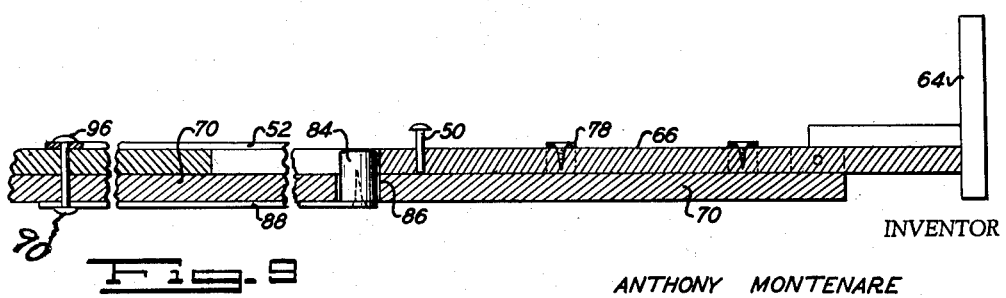

United States Patent Office 3,112,784
Patented Dec. 3, 1963

3,112,784
DEMOUNTABLE TRACTION DEVICE FOR AUTOMOBILE WHEELS
Anthony Montenare, 326 N. 4th St., Reading, Pa.
Filed Sept. 19, 1960, Ser. No. 56,943
3 Claims. (Cl. 152—216)

This invention relates to a traction device for attachment to the wheels, especially the drive wheels, of automobiles. Such devices may also be readily attached to the wheels of buses and trucks, or other automotive vehicles.

A principal object of the invention is the provision of a non-skid device for attachment to the wheels, particularly the drive wheels, of automotive vehicles for increasing the ability of such wheels to propel the vehicle in either a forward or rearward direction under adverse conditions, i.e. when roads or streets are covered with ice or snow or when muddy roads are encountered.

Another object is the provision of means for quickly attaching or detaching the device to an automotive vehicle, the device having means for retaining its tractive elements in either an operative or inoperative position without detaching the same from an automotive vehicle.

A further object is to provide means for partially supporting the weight of the vehicle until such time as the vehicle may be driven to a service station, in the event the tire of the wheel upon which it is mounted becomes flat. In other words, the device of this invention may be used as an emergency wheel support in the event the tire of that particular wheel becomes disabled for any reason.

Yet another object is an auxiliary wheel support that consists of a minimum of parts and which may be mounted on a wheel or demounted from the wheel without requiring the jacking up of the wheel on which it is mounted.

Other objects will appear hereinafter throughout the specification.

In the drawings:

FIGURE 1 is a side elevation of my invention with parts broken away, and showing the preferred form of the invention in contracted and expanded positions;

FIGURE 2 is a perspective view, partly in section and partly broken away, of one of the shoes in extended position and means for guiding the same;

FIGURE 3 is a side view of one of the said shoes and means for supporting the same;

FIGURE 6 is an elevational view, partly broken away, of a modified form of the invention, the parts being shown in closed position;

FIGURE 7 is a view similar to FIGURE 6 but with the parts shown in extended position;

FIGURE 8 is an enlarged perspective view, partly broken away, of one of the shoes shown in FIGURE 7 and its support in extended position;

FIGURE 9 is a sectional view taken on the line 9—9 of FIGURE 6;

Figure 10:
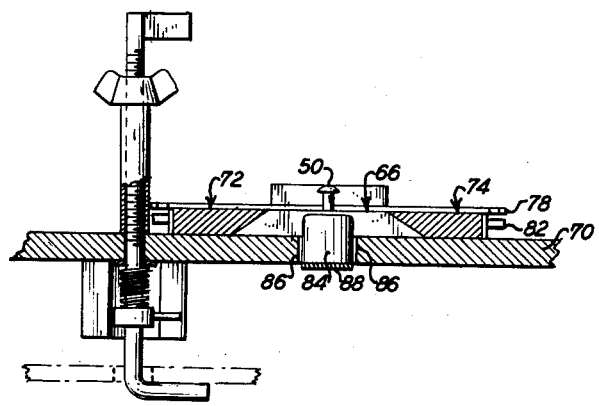
FIGURE 10 is a sectional view taken on the line 10—10 of FIGURE 8.
Figure 4:
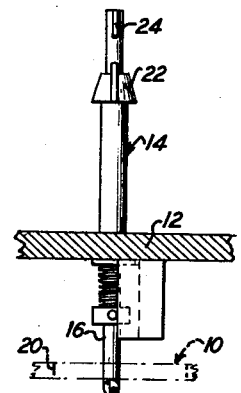
FIGURE 4 is an elevational view of one of the locking members and the support means therefor.
Figure 11:
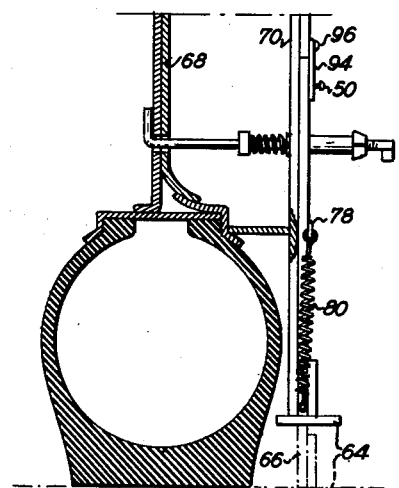
FIGURE 11 is a schematic section showing the approximate relation of the various parts of the modified form of the invention to an automobile tire, the dotted and dash lines showing the shoe in extended position.
Figure 5:
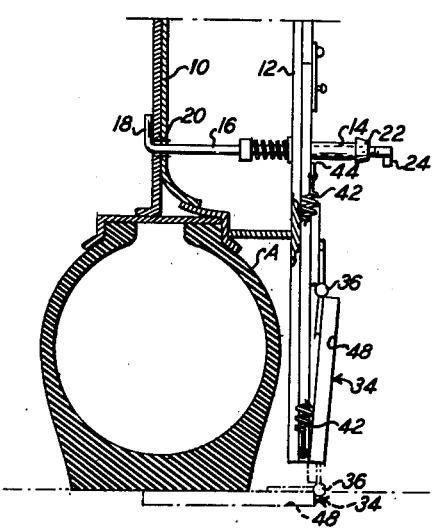
FIGURE 5 is a sectional view, with some parts shown in full lines, showing the approximate relation of one of the shoes to an automobile tire, the dotted and dash lines showing the shoe in extended position.

Referring now to the preferred form of the invention shown in FIGURES 1 to 5, inclusive, the letter A indicates an automobile tire. Mounted on the wheel 10 which supports said tire is a plate 12, preferably circular and concentric with the center of the wheel 10. Means is provided for locking the plate to the wheel which comprises the structure illustrated in FIGURES 4 and 5. This consists of a plurality of tubular members, one of which is shown in these figures, the same being indicated by the reference numeral 14. Each of these members consists of an interiorly threaded tube, the threads of which are engaged by the exteriorly threaded locking member 16, the lower end of which is in the form of a hook 18. This hook is projected through a slot 20 of the wheel 10 so as to engage behind the plate 12 on the opposite side of the wheel 10, as best shown in FIGURE 5. After the locking member has been inserted in said slot in the position shown in FIGURE 5, the wing nut 22, which also engages the screw threads of the locking member, is tightened so as to pull the hooked end toward the plate. One end of the locking member is provided with a handle 24 whereby the locking member may be rotated within the tube 14. These parts are also shown in FIGURE 10. Several of the locking assemblies illustrated in FIGURES 4, 5 and 10, for instance, are spaced circumferentially about the plate 12 so as to tightly affix the said plate to the wheel when the screw-threaded elements are caused to clampingly engage the wheel to the plate.

As noted particularly in FIGURE 1, the plate 12 mounts a plurality of guide members 26. These guide members are provided with spaced sides 28 and 30, the guides having undercut portions 32, as seen in FIGURE 2.

Each shoe 34 is provided with a pivot or hinge portion 36 that pivotally connects its shoe to a tongue 38, the tongue being provided with slanting sides 40. Each tongue, therefore, which mounts its shoe, is guided in a radial direction and slides between a pair of guide members 26, as clearly shown in FIGURE 2.

Each tongue and the shoe which it supports is biased by one or more springs which tend to move the shoe and the tongue which supports the same radially outwardly. The lower end of each spring is mounted on a yoke member 44 which is fixed to its tongue 38, and the opposite end of each spring, that is, the end nearest the periphery of the tire A, is connected to one of the fixed supports 46, each support being fixed to the upper end of one of the spaced sides. Therefore, when the shoes are released by a means now to be described, the springs 42 immediately project the shoes radially and outwardly from the center of the support. Each shoe is provided with a tread surface 48.

As shown at 120 in FIGURE 1 each tongue member 38 engages a pair of studs 120 on the guide members 26 to limit outward movement of the tongue and shoe.

Any suitable means may be used to retain the shoes in their inoperative position, two of which are shown in FIGURE 1, as, for example, the two leftmost shoes illustrated in this figure and the two rightmost shoes. Such means for retaining the shoes in their inoperative position is indicated by stud members 50 which are attached to the lowermost portions of the tongues 38. Each stud member 50 is adapted to be engaged by a pivoted hook 52, the pivots being indicated by reference numeral 54. Such hooks are shown in engagement with the two leftmost shoes shown in FIGURE 1, while the two rightmost shoes of this figure are disengaged from the pivoted hooks. In other words, when it is desired to release the shoe whereby the springs 42 will project it from the position shown in the leftmost position of FIGURE 1 to the position shown in the rightmost positions of FIGURE 1, it is merely necessary to rotate each hook 52 in a counterclockwise direction on the pivot 54.

It will be understood that when the shoe reaches its extended position, it is rotated on its hinge 36 by means of a spring, which biases the shoe from a position where it lies in a plane parallel to the plane of the tire to a position which is transverse to the plane of the tire. The rotation of the shoe may be accomplished by using a conventional spring 121 in each hinge as shown in FIGURE 2 diagrammatically.

The means for holding each shoe in its projected position comprises a finger 56, best shown in FIGURE 2, that extends through an aperture 58 of the plate 12 and which is provided with a flat spring 60, one end of which mounts the finger 56 and the other end of which is attached at 62 to the underside of the plate 12.

The modified form of the invention illustrated in FIGURES 6 to 11 is quite similar to that shown in FIGURES 1 to 5, the principal difference being that the shoe 64 which corresponds to the shoe 34 of the preferred form is rigid with its support. In other words, the shoe 64 has no means for pivoting on its tongue 66 but is rigid with the tongue.

In the modified form of FIGURES 6 to 11, 68 is the wheel, and 70 the plate, as shown in FIGURE 8; 14 is the tubular member which is constructed and operated in the same manner as the tubular member 14 illustrated in the first form of the invention, as shown in FIGURES 4 and 10. The guide members are illustrated by reference numerals 72 and 74. The shoe 64 is rigidly mounted on the tongue 66, which tongue is slideable in the guide members 72 and 74, said guide members being undercut in the same manner as guide members 28 and 30 illustrated in FIGURE 2, and the tongue is provided with inclined portions or slanting sides 76.

The tongue is also provided with a yoke member 78, corresponding to yoke member 44 of FIGURE 3, which supports one end of the springs 80 which correspond to springs 42 of FIGURE 1. The opposite ends of these springs are connected at 82 to the guide members.

The shoe 64 is supported in its extended position by fingers 84 which extend through an opening 86 (see FIGURE 9) and are connected to the wheel 68 by the flat spring 88, the opposite end of which is anchored at 90 to said wheel. The tongue 66 is provided with a stud member 92 for engagement by a hook 94, the opposite end of which is pivotally connected at 96 to the wheel.

Figure 12:
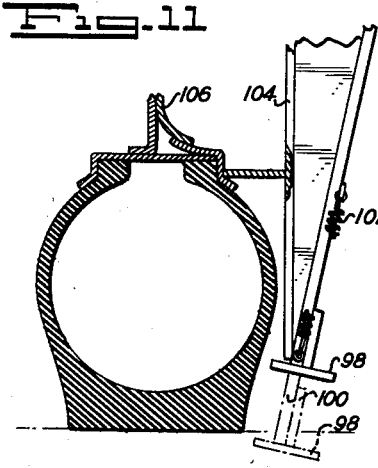
FIGURE 12 is a view similar to FIGURE 11 but showing a third form of the invention.

Referring now to the third form of the invention, said form being illustrated in FIGURE 12, this form is similar to the second form in that the shoe 98 is rigidly mounted on the tongue. When the springs 102 (which correspond to springs 80 or 42 of the other figures) are released, they project the shoes 98 at an angle to the plane of the wheel 106 and the plate 104, which corresponds to the plates 12 and 70.

It will be understood that the parts may be so proportioned that the tread surfaces of each shoe when projected are substantially level or of equal height with the tread surfaces of the tire, which is mounted on the same wheel with the anti-skid device, although it is to be distinctly understood that the tread surfaces of the shoes may be either below or above the tread surfaces of the tire when the said shoe is in its projected or ground-engaging position.

It will be further understood that suitable stops, not shown, will be provided, preferably on the guide members on each of the forms in order to prevent each shoe from being projected too far above the tread surfaces of the tire upon being released.

It will be further understood that the spring hooks 52, such as shown in FIGURES 1 and 6, may be provided with springs at their pivotal supports, such as 96 in FIGURE 8, whereby they are biased in a clockwise direction so as to readily catch and hold the tongue pins 50 of FIGURE 1 and 84 of FIGURE 8 when each tongue with its shoe is pushed back to its retracted position, such as shown in FIGURES 1 and 6.

The above description and the drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. An anti-skid device for a vehicle wheel equipped with a pneumatic tire, said device comprising a supporting means, means for connecting said supporting means to said vehicle wheel, said device including a plurality of supporting tongues, guide means for each of said tongues, a ground-engaging arcuate shoe supported on the end of each tongue, said shoes defining a substantial circle in their projected positions, and means for locking said tongues and shoes in their projected positions, said guide means extending radially of said wheel whereby to guide said shoes in a substantially radial direction only, a yoke member having ends extending transversely of each of said tongues and rigidly fastened thereto, coil springs having ends connected to the ends of each yoke member, the opposite ends of said springs being connected to said supporting means radially outwardly of the yoke member urging said tongue radially outwardly.

2. The structure of claim 1 wherein said shoe is provided with means pivotally connecting the same to its tongue.

3. The structure of claim 1 wherein means mounting each shoe on each tongue comprises a hinge connecting the tongue and shoe to each other, and a pivoted hook member for each shoe, mounted on said support means for holding the shoe in its retracted position.

References Cited in the file of this patent

UNITED STATES PATENTS

| | | |
|---|---|---|
| 587,682 | Cornell | Aug. 3, 1897 |
| 1,327,538 | Etter | Jan. 6, 1920 |
| 1,331,945 | Smith | Feb. 24, 1920 |
| 1,411,692 | Gobel | Apr. 4, 1922 |
| 1,549,004 | Kading | Aug. 11, 1925 |
| 2,079,501 | Gallagher et al. | May 4, 1937 |
| 2,212,076 | Rollings | Aug. 20, 1940 |
| 2,221,838 | Kane | Nov. 19, 1940 |
| 2,249,138 | Hill | July 15, 1941 |
| 2,494,850 | Williams | Jan. 17, 1950 |

FOREIGN PATENTS

| | | |
|---|---|---|
| 592,034 | Germany | Jan. 31, 1934 |